(12) United States Patent
Seliger et al.

(10) Patent No.: US 8,835,573 B2
(45) Date of Patent: Sep. 16, 2014

(54) BIODEGRADABLE COMPOSITE SYSTEM AND THE USE THEREOF

(75) Inventors: Hartmut Seliger, Elchingen-Thalfingen (DE); Hans Häberlein, Gersthofen (DE)

(73) Assignee: Universität Ulm, Ulm (DE)

( * ) Notice: Subject to any disclaimer, the term of this patent is extended or adjusted under 35 U.S.C. 154(b) by 96 days.

(21) Appl. No.: 12/745,224

(22) PCT Filed: Nov. 28, 2008

(86) PCT No.: PCT/EP2008/010132
§ 371 (c)(1),
(2), (4) Date: May 27, 2010

(87) PCT Pub. No.: WO2009/068309
PCT Pub. Date: Jun. 4, 2009

(65) Prior Publication Data
US 2010/0324176 A1    Dec. 23, 2010

(30) Foreign Application Priority Data
Nov. 30, 2007  (DE) .......................... 10 2007 057 768

(51) Int. Cl.
| C08F 283/04 | (2006.01) |
|---|---|
| C08K 11/00 | (2006.01) |
| C08L 89/00 | (2006.01) |
| C08L 97/02 | (2006.01) |
| C08G 18/73 | (2006.01) |
| C08L 67/04 | (2006.01) |
| C08L 75/06 | (2006.01) |
| C08G 18/42 | (2006.01) |
| C08L 3/00 | (2006.01) |
| C08L 1/08 | (2006.01) |

(52) U.S. Cl.
CPC ............. *C08G 18/4283* (2013.01); *C08L 97/02* (2013.01); *C08G 18/73* (2013.01); *C08L 2205/16* (2013.01); *C08L 3/00* (2013.01); *C08G 2261/126* (2013.01); *C08G 2230/00* (2013.01); *C08L 67/04* (2013.01); *C08L 1/08* (2013.01); *C08L 75/06* (2013.01)
USPC ............................................. 525/454; 524/9

(58) Field of Classification Search
USPC ...................... 525/454, 450; 524/9
See application file for complete search history.

(56) References Cited

U.S. PATENT DOCUMENTS

| 4,287,116 | A |  | 9/1981 | Burns |
|---|---|---|---|---|
| 4,879,032 | A |  | 11/1989 | Zemlin |
| 5,391,423 | A |  | 2/1995 | Wnuk |
| 5,417,679 | A |  | 5/1995 | Toms et al. |
| 5,502,116 | A |  | 3/1996 | Noda |
| 5,599,858 | A |  | 2/1997 | Buchanan et al. |
| 5,665,831 | A |  | 9/1997 | Neuenschwander et al. |
| 5,733,945 | A |  | 3/1998 | Simpson |
| 5,801,207 | A |  | 9/1998 | Bastioli |
| 5,827,905 | A |  | 10/1998 | Grigat et al. |
| 5,939,467 | A |  | 8/1999 | Wnuk et al. |
| 6,008,276 | A |  | 12/1999 | Kalbe et al. |
| 6,096,809 | A |  | 8/2000 | Lorcks et al. |
| 6,191,203 | B1 | * | 2/2001 | Asrar et al. ............... 524/317 |
| 6,228,969 | B1 |  | 5/2001 | Lee et al. |
| 6,235,816 | B1 |  | 5/2001 | Lorcks et al. |
| 6,248,862 | B1 | * | 6/2001 | Asrar et al. ............... 528/361 |
| 6,515,054 | B1 |  | 2/2003 | Matsushita et al. |
| 6,555,645 | B1 |  | 4/2003 | Ikeda et al. |
| 6,753,384 | B2 | * | 6/2004 | Whitehouse et al. ......... 525/415 |
| 6,780,903 | B2 |  | 8/2004 | Peltonen et al. |
| 6,841,603 | B1 | * | 1/2005 | Asrar et al. ............... 524/404 |
| 6,852,418 | B1 |  | 2/2005 | Zurbig et al. |
| 7,074,850 | B2 | * | 7/2006 | Hees et al. ............... 524/590 |
| 7,077,994 | B2 |  | 7/2006 | Bond et al. |
| 2002/0020827 | A1 |  | 2/2002 | Munzenberger et al. |
| 2002/0035231 | A1 |  | 3/2002 | Whitehouse et al. |
| 2002/0042481 | A1 |  | 4/2002 | Marchessault et al. |
| 2004/0092695 | A1 |  | 5/2004 | Hu et al. |
| 2004/0122135 | A1 |  | 6/2004 | Hailey et al. |
| 2004/0142184 | A1 | * | 7/2004 | Behle et al. .............. 428/447 |
| 2004/0225269 | A1 | * | 11/2004 | Zhao et al. ............... 604/364 |
| 2004/0248486 | A1 | * | 12/2004 | Hodson ..................... 442/79 |
| 2005/0013793 | A1 |  | 1/2005 | Beckman et al. |
| 2005/0107564 | A1 |  | 5/2005 | Klingenberg et al. |
| 2005/0182196 | A1 |  | 8/2005 | Khemani et al. |

(Continued)

FOREIGN PATENT DOCUMENTS

| DE | 19931323 A1 | 1/2001 |
|---|---|---|
| FR | 2840309 A | 12/2003 |
| GB | 908949 A | 10/1962 |
| JP | 04-093315 A | 3/1992 |
| JP | 06-157703 A | 6/1994 |
| JP | 08-059811 A | 3/1996 |
| JP | 09-137046 A | 5/1997 |
| JP | 2002-504939 A | 2/2002 |
| JP | 2005-232229 A | 9/2005 |
| JP | 2006-137854 A | 6/2006 |
| JP | 2007-137928 A | 6/2007 |
| JP | 2007-302776 A | 11/2007 |
| WO | WO 2005/121216 | 12/2005 |

OTHER PUBLICATIONS

Ramsay, B. A. and Ramsay, J. A. 2001. Poly(3-hydroxyalkanoates). Encyclopedia of Polymer Science and Technology.*

(Continued)

*Primary Examiner* — Liam J Heincer
(74) *Attorney, Agent, or Firm* — Leydig, Voit & Mayer, Ltd.

(57) ABSTRACT

The invention relates to a composite system comprising at least one biodegradable blend, containing at least one biodegradable block copolyester urethane (PEU) and also at least one polyhydroxyalkanoate (PHA), possibly a filler comprising a polysaccharide and/or derivatives thereof and also possibly further biocompatible additives. Composite systems of this type are used for producing molded articles, molded parts or extrudates. Furthermore, the invention relates to possibilities for using the composite system.

25 Claims, 6 Drawing Sheets

(56) References Cited

U.S. PATENT DOCUMENTS

| | | | |
|---|---|---|---|
| 2005/0182235 A1* | 8/2005 | Zhong et al. ................ 528/361 |
| 2005/0209374 A1 | 9/2005 | Matosky et al. |
| 2006/0106127 A1 | 5/2006 | Klettke et al. |
| 2006/0240726 A1* | 10/2006 | Hodson ........................ 442/59 |
| 2007/0293605 A1* | 12/2007 | Seliger et al. ................ 524/41 |
| 2008/0319103 A1* | 12/2008 | Hsieh et al. .................. 523/116 |
| 2009/0253816 A1* | 10/2009 | Nascimento et al. ......... 521/90 |

OTHER PUBLICATIONS

Oksman, Applied Composite Materials 7, 403-414, 2000.*

Kumar et al., "Crystalline and Solid-State Structures of Polyhydroxyalkanoates (PHA)," *Chapter 6: Practical Guide to Microbial Polyhydroxyalkanoates*, iSmithers Rapra Publishing, Akron, Ohio, Publishers. pp. 25-49 (2010).

International Preliminary Report on Patentability (English Translation) mailed Jul. 6, 2010 for International Application PCT/EP2008/010132.

Fukui et al., Appl. Microbiol. Biotechnol. No. 49, pp. 333-336 (1998).

Hirt et al., *Macromol Chem. Phys.*, 197: pp. 4253-4268 (1996).

Nakamura et al., Macromolecules, vol. 25, No. 17, pp. 4237-4241 (1992).

Saad et al., *J. Applied Polymer Science*, 83: pp. 703-718 (2002).

Saad et al., *Macromol. Biosci.*, vol. 1, No. 3, pp. 91-99 (2001).

Saad et al., *Polymer Degradation and Stability*, vol. 83, No. 1, pp. 101-110 (2004).

Saad, *Macromol. Biosci.*, vol. 1, No. 9, pp. 387-396 (2001).

Singh et al., *Composites Part A: Applied Science and Manufacturing*, vol. 39, No. 5, pp. 875-886 (2008).

International Search Report mailed Dec. 13, 2005 for International Application PCT/EP2005/006103.

International Search Report mailed Mar. 3, 2009 for International Application PCT/EP2008/010132.

Azuma et al., "Thermal behaviour and miscibility of poly(3-hyroxybutyrate)/poly(vinyl alcohol) blends," *Polymer*, vol. 33, No. 2, pp. 4762-4767 (1992).

Muller et al., "Poly(hydroxyalkanoates): A Fifth Class of Physiologically Important Organic Biopolymers?" Angew. Chem. Int. Ed. Engl. 32, pp. 477-502 (1993).

Japanese Patent Office, Notification of Reason(s) for Refusal in Japanese Patent Application No. 2010-535296 (May 8, 2013).

Japanese Patent Office, Notification of Reason(s) for Refusal in Japanese Patent Application No. 2010-535296 (May 7, 2014).

* cited by examiner

BIODEGRADABLE COMPOSITE SYSTEM AND THE USE THEREOF

CROSS-REFERENCE TO RELATED APPLICATIONS

This patent application is the U.S. national phase of International Application No. PCT/EP2008/010132, filed on Nov. 28, 2008, which claims the benefit of German Patent Application No. DE 10 2007 057 768.2, filed Nov. 30, 2007, the disclosures of which are incorporated by reference.

BACKGROUND OF THE INVENTION

The invention relates to a composite system comprising at least one biodegradable blend, containing at least one biodegradable block copolyester urethane (PEU) and also at least one polyhydroxyalkanoate (PHA), possibly a filler comprising a polysaccharide and/or derivatives thereof and also possibly further biocompatible additives. Composite systems of this type are used for producing moulded articles, moulded parts or extrudates. Furthermore, the invention relates to possibilities for using the composite system.

Poly-(R)-3-hydroxyalkanoates (PHA), such as e.g. poly-(R)-3-hydroxybutyrate (R-PHB), are an almost ideal polymer material from an environmental point of view and from the aspect of sustainability. They are produced from waste of sugar production, i.e. from renewable raw materials, by means of bacterial fermentation on an industrial scale. It is stable under conditions in which plastic materials are normally used but can be biodegraded within weeks to months in a dump or in a composting process. R-PHB can be processed thermoplastically and can be readily recycled as a thermoplastic. It is biocompatible, biodegradable and can be used as a component of implant materials and as a good substrate for cell growth. By means of degradation of R-PHB, stereoregular organic synthesis structural units could be obtained.

The R-PHB obtained from bacteria has however unfavourable material properties for many applications. It is brittle and inelastic and the production of transparent films is not possible. The melting point at 177° C. is so high that only a relatively small temperature range for thermoplastic processing results until the start of decomposition at approx. 210°. All these disadvantages result from the high crystallinity of the R-PHB. Finally, also cell fragments which decompose during processing often remain from the reprocessing of the biological material, which leads to an unpleasant odour problem.

In order to eliminate the difficulties of the thermoplastic processing, two routes have been adopted above all. It has been attempted therefore, on the one hand, to set low processing temperatures by means of physical measures, in particular by delaying crystallisation. On the other hand, bacterial cultures and substrates which enable the production of copolymers, in particular poly-3-hydroxybutyrate-co-3-hydroxyvalerate, have been used. In the first case, ageing leads nevertheless to recrystallisation, i.e. embrittlement. In the latter case, a reduction in the melting temperature and an increase in the elasticity is indeed achieved, however the possibility of controlling the properties by bacterial copolymerisation is provided only within narrow limits.

Poly-(R)-3-hydroxybutyrate-covalerate (PHB-HV) is in fact lower-melting; however bacteria incorporate only a relatively small hydroxyvalerate proportion (up to approx. 12%), whilst good material properties are anticipated only after above approx. 20% HV proportion.

BRIEF SUMMARY OF THE INVENTION

Starting herefrom it is the object of the present invention to provide a polymer system which avoids the mentioned disadvantages of the state of the art and provides a polymer material, the elasticity of which is controllable, the material being intended to be completely biodegradable.

This object is achieved by the generic composite system having the features described herein and also by the moulded articles, moulded parts and extrudates produced accordingly. The use of the composite system according to the invention is described and reveal advantageous developments.

According to the invention, a composite system is provided, comprising at least one biodegradable block copolyester urethane, the block copolyester urethane being formed from a hard segment comprising a polyhydroxyalkanoate diol and also a polyester diol- and/or a polyester ether diol soft segment starting from a diol and a dicarboxylic acid or hydroxycarboxylic acid and derivatives thereof as co-component by crosslinking with a bifunctional isocyanate, and also at least one polyhydroxyalkanoate, optionally a filler comprising a polysaccharide and/or derivatives thereof and also optionally further biocompatible additives. It is essential for the composite system according to the invention that the block copolyester urethane is formed from a hard segment comprising a polyhydroxyalkanoate diol and also a polyester diol- and/or a polyester ether diol soft segment, starting from a diol and a dicarboxylic acid or hydroxycarboxylic acid and derivatives thereof as co-component by crosslinking with a bifunctional isocyanate. The composite system comprising PEU and PHA is thereby present preferably as a blend, polymer mixture and/or -alloy.

It was found surprisingly that the properties of biosynthetic PHAs are improved substantially by mixing in or blending in in particular relatively small quantities of PEU. In particular, the following advantages are thereby produced:

The melting temperature is lowered.

The brittle material character is overcome.

Hard/tough materials of high impact strength or notch impact strength are produced.

The hardness of the material can be increased further by mixing in flax, hemp or wood fibres.

A second attractive aspect is the ecological one: the mixture suitable for the invention contains only approx. 2 to 5% of substance components not obtained from a renewable raw material, therefore comes very close to being a biomaterial obtained completely from a renewable raw material and hence to the idea of a recycling economy.

A further advantage of the material according to the invention which is produced by mixing polyester urethanes, as opposed to sole use thereof, in which PHB is the starting component or can possibly be added as additive but advantageously is still used only in a smaller quantity, resides in the fact that, according to the invention, the component PEU is used now, for its part, only in a low admixture to the main component PHA. The result thereof is less complexity in the production of the material since PHAs are used directly as biosynthetic material, whereas PEU demands a two-stage process for conversion from the PHAs. Hence, the requirement for solvents and energy which is required for production of the same material quantity is substantially reduced.

It is hereby advantageous if the weight proportion of the block copolyester urethane in the blend is of 0.1 to 50% by weight, preferably of 5 to 35% by weight, particularly preferred between 5 and 25% by weight and the weight proportion of the polyhydroxyalkanoate in the blend is of 99.9 to 50% by weight, preferably of 95 to 65% by weight, particularly preferred between 95 and 75% by weight.

The polyhydroxyalkanoate (PHA) is hereby in particular a poly-2-hydroxyalkanoate, poly-3-hydroxyalkanoate and/or poly-4-hydroxyalkanoate and/or a polyhydroxyalkanoate which contains aliphatic, araliphatic or aromatic side chains. In particular, the polyhydroxyalkanoate (PHA) is selected from the group comprising poly-(R)-3-hydroxybutyrate (PHB) and/or poly-(R)-3-hydroxybutyrate-co-valerate (PHB-co-HV).

Preferably, the elasticity, toughness and tensile elongation of the composite system is adjusted specifically via the quantity proportion of the block copolyester urethane and of the filler.

The polyhydroxyalkanoate diol used as hard segment is preferably a poly-2-hydroxyalkanoate diol, a poly-3-hydroxyalkanoate diol and/or a poly-4-hydroxyalkanoate diol, and/or the polyhydroxyalkanoate diol comprises aliphatic, araliphatic or aromatic side chains. In particular, the polyhydroxyalkanoate diol is selected from the group consisting of poly-3-hydroxybutyrate diol (PHB diol) and/or poly-3-hydroxybutyrate-co-3-hydroxyvalerate diol (PHB-co-HV-diol).

The production of the hard segment is thereby effected by reesterification with a diol which contains 2 to 10 C atoms and preferably is aliphatic, cycloaliphatic, araliphatic and/or aromatic, but can also be an oligo- or polyether diol, for example polyethylene glycol-200 or -300. There is used for particular preference as diol, 1,4-butane diol or diethylene glycol.

The production of the hard segment can also be effected with a triol. Glycerine is thereby particularly preferred.

The soft segment is produced by reesterification of a dicarboxylic acid with a diol. The dicarboxylic acid is thereby preferably aliphatic, cycloaliphatic, araliphatic and/or aromatic. For the reesterification, aliphatic, cycloaliphatic, araliphatic and/or aromatic diols are preferred.

1,4-butane diol or diethylene glycol is hereby particularly preferred.

Preferably polybutylene glycol adipate diol (PBA diol) is used as soft segment.

Furthermore, the block copolyester urethane according to the invention is constructed from a bifunctional isocyanate which is preferably aliphatic, cycloaliphatic, araliphatic and/or aromatic, as crosslinking member. The bifunctional isocyanate is particularly preferably selected from the group tetramethylene diisocyanate, hexamethylene diisocyanate and isophorone diisocyanate.

There are used as biodegradable fillers, fillers based on polysaccharides, preferably those from the group starch and derivatives thereof, cyclodextrines and also cellulose, paper dust and cellulose derivatives, such as cellulose acetates or cellulose ethers. There are thereby particularly preferred as cellulose derivatives, compounds from the group methyl cellulose, ethyl cellulose, dihydroxypropyl cellulose, hydroxyethyl cellulose, hydroxypropyl cellulose, hydroxybutyl cellulose, methylhydroxybutyl cellulose, ethylhydroxybutyl cellulose, ethylhydroxyethyl cellulose, carboxyalkyl cellulose, sulphoalkyl cellulose and cyanoethyl cellulose.

The filler is preferably a natural product and is used preferably in fibre form, for example as flax fibre, hemp or wood dust.

In addition to the mentioned main components, the composite system can comprise further additives. There are included herein preferably biocompatible adhesives, colour pigments or mould-release agents, such as talcum. Also carbon black can be comprised as further additive. Particularly preferred as additives are polyethylene glycol and/or polyvinyl alcohol as biocompatible adhesives.

With respect to the quantity proportions of the individual components, the composite system is not restricted. The composite system preferably contains between 1 and 90% by weight of filler, particularly preferred between 1 and 70% by weight. These quantity details relate to the total composite system.

In a preferred embodiment, the composite system is constructed in layers, one filler layer based on polysaccharides being coated at least in regions on one and/or both sides with the blend.

In a further preferred embodiment, at least one further polymer is blended or alloyed with the composite system.

According to the invention, likewise moulded articles, moulded parts and extrudates which have been produced from a composite system are provided.

The composite systems according to the invention are used for the production of coating materials, foils, films, laminates, moulded articles, moulded parts, extrudates, containers, packaging materials, coating materials and medicine dispensers. The application fields for materials of this type are very wide and relate for example to door side coverings and attachments in the interior within the automobile sphere, seat shells and seat backs for furniture, snail traps, buried lights for gardening, golf tees, battery holders in the toy field, protective elements in the packaging field, disposable parts in the building sector or even for example Christmas decorations.

BRIEF DESCRIPTION OF THE DRAWINGS

The subject according to the invention is intended to be explained in more detail with reference to the subsequent Figures and examples without restricting said subject to the special embodiments shown here.

EXAMPLE 1

Production of the Block Copolyester Urethanes

Figure 1:
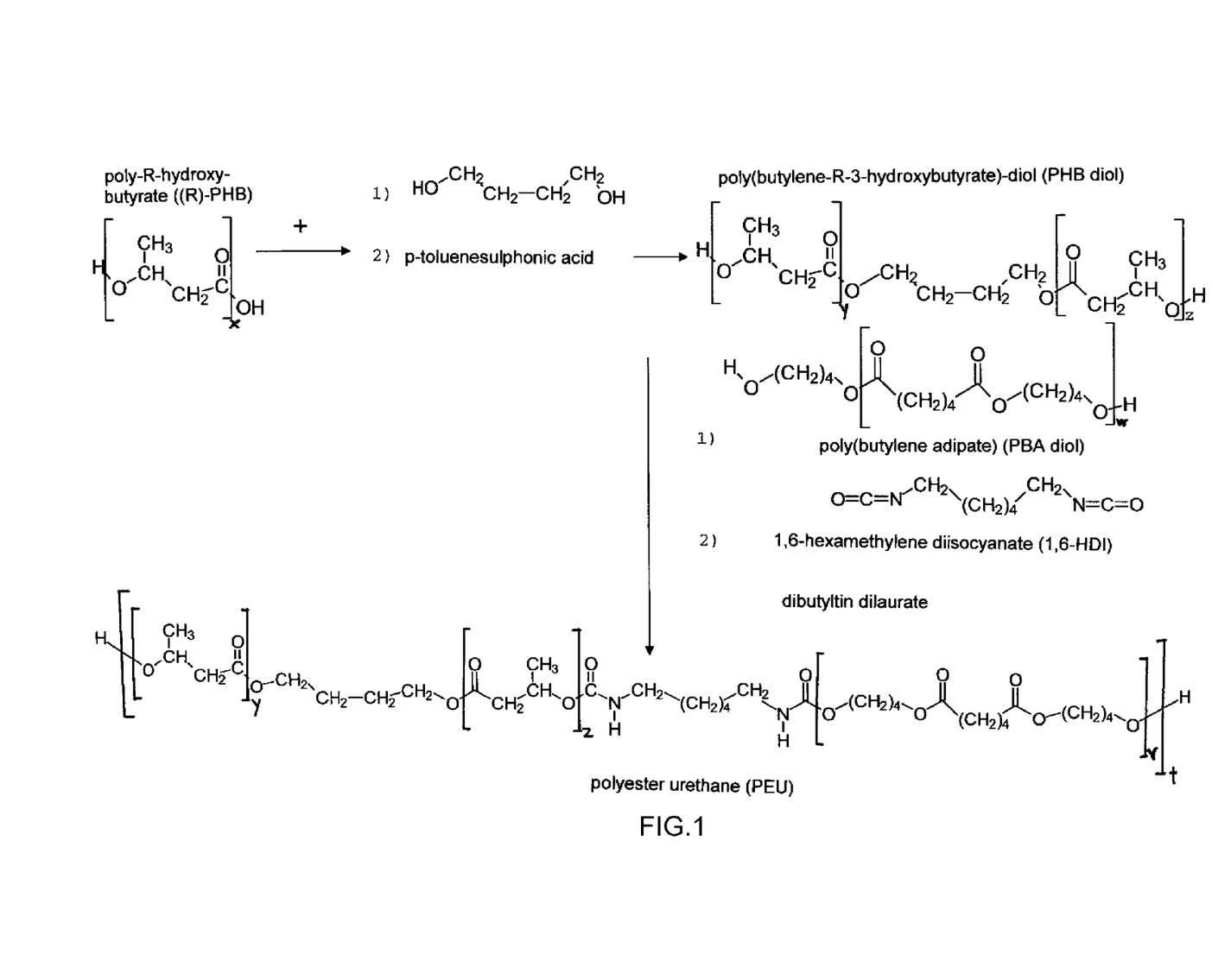
FIG. 1 shows the synthesis diagram for preparing a polyester urethane.

The polyester urethane is prepared according to a variant by G. R. Saad (G. R. Saad, Y. J. Lee, H. Seliger, J. Appl. Poly. Sci. 83 (2002) 703-718) which is based on a specification by W. Hirt et al. (7, 8). The synthesis is effected in two stages. Bacterial poly-3-hydroxybutyrate (PHB Industrial S.A.) is firstly converted in the presence of sulphuric acid as catalyst with 1,4-butane diol. After cleaning, the obtained short-chain butylene glycol-bis-(poly-(R)-3-hydroxybutyrate)-diol (PHB diol) is polyadded likewise catalytically (zirconium acetyl acetonate) with poly(butyleneadipate)-diol (PBA diol) as co-component and hexamethylene diisocyanate to form polyester urethane. In FIG. 1, the synthesis diagram for the preparation of polyester urethane is represented.

1.1. Preparation of poly(butylene-(r)-3-hydroxybutyrate)-diol

Poly(butylene-(R)-3-hydroxybutyrate)-diol was produced in various batches. Bacterial PHB was thereby dissolved in chloroform and transesterified with 1,4-butane diol at 61° C. P-toluenesulphonic acid was used as catalyst. By subsequent precipitation and rewashing, the product was obtained in solid form.

In the individual tests, different parameters, such as morphology of PHB, solvent quantity, catalyst quantity, agitation time, processing, were varied.

Ground and fibrous PHB was used. Under the chosen conditions, PHB was not able to be dissolved completely. The flask contents before the addition of 1,4-butane diol and p-toluenesulphonic acid was therefore pasty but still able to be agitated well with heat. With increasing reaction time, the reaction material became increasingly more liquid but remained turbid. Furthermore, an almost linear dependency of the reaction time upon the catalyst quantity could be established.

There were great differences in the precipitation of the chloroform solutions in methanol, diethylether, toluene and cyclohexane. Whilst with methanol, toluene and cyclohexane very fine crystalline precipitates were produced, which were very difficult to suction off and wash, diethyl ether produced a very clean, rough crystalline material. In contrast, the molar weights scarcely differ. Cyclohexane was subjected to a more precise investigation. Only fine crystalline product was thereby produced independently of the solvent/precipitant concentration. If the reaction solution is put in place and cyclohexane is added in drops, the precipitation behaves completely differently. After initial turbidity, the product was produced in very coarse powder form and could be filtered just as well as the solids from diethylether. All the solids were produced as almost white powder.

The yields were 60 to 94% of the theoretical. The $M_n$ were between 1,500 and 5,500 g/mol. The products were investigated by means of $^1H$ nuclear resonance spectroscopy (see FIG. 2A and FIG. 2B).

1.2. General Method Specification for the Synthesis of the Macro-Diol I (PHB Diol, PHB-co-HV-diol) Components Dioxane and diol component are heated to 85° to 90°. 98% sulphuric acid is added carefully. Then PHA is added. It is heated to reflux with agitation. After complete homogenisation, the solution is left to react at reflux, generally an almost clear solution being produced. After the reaction, cooling to 85° takes place. For neutralisation, a 45% solution of KOH in water is added. Then the reaction material is added slowly to the precipitant (25% dioxane+75% cyclohexane). Then the material is left to cool to room temperature and the macro-diol I is filtered off.

Yield: 90-96% of the theoretical.

Figure 2A:
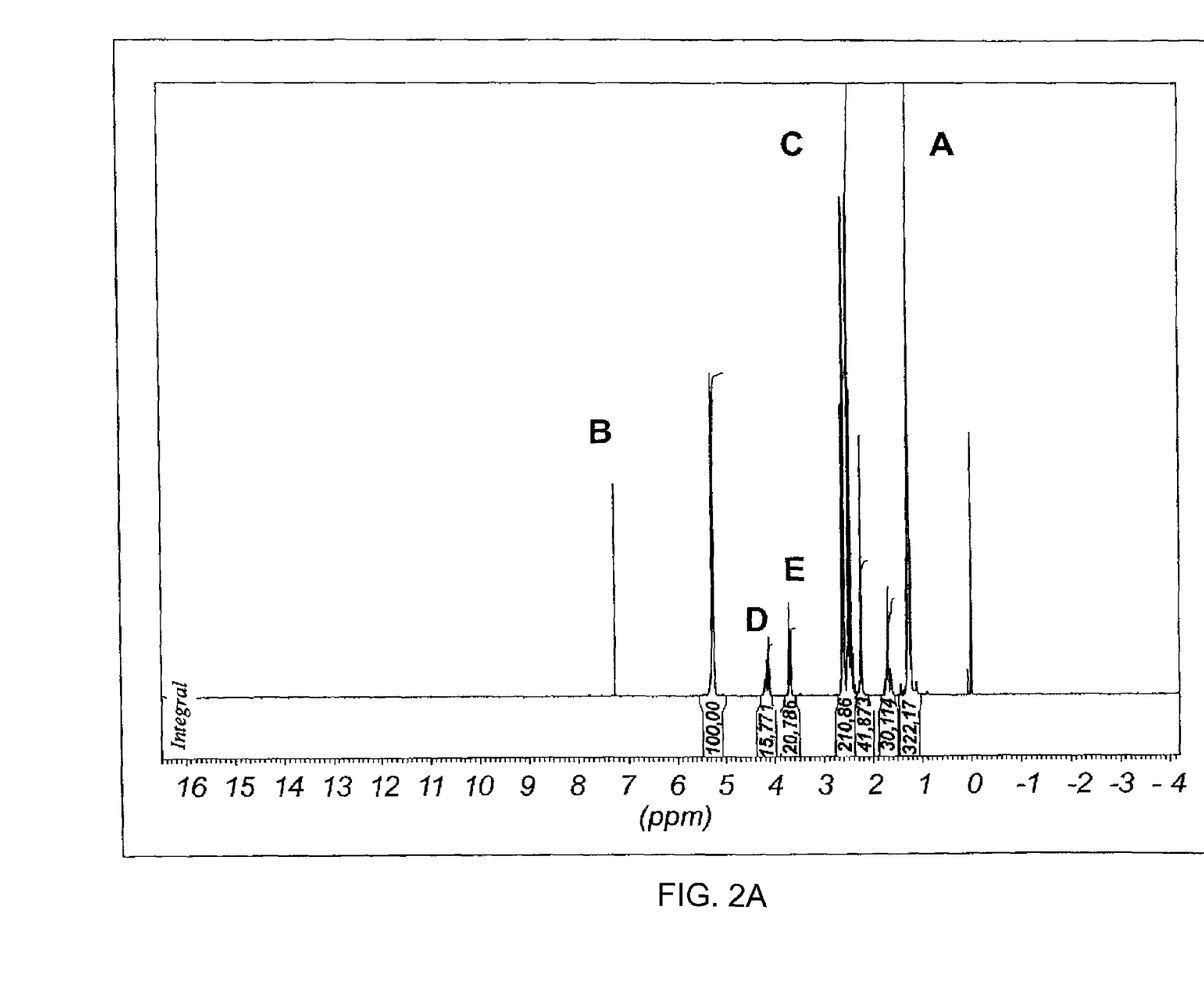
FIG. 2A shows the $^1$H nuclear resonance spectrum (400 MHz) of the PHB diol.
Figure 2B:
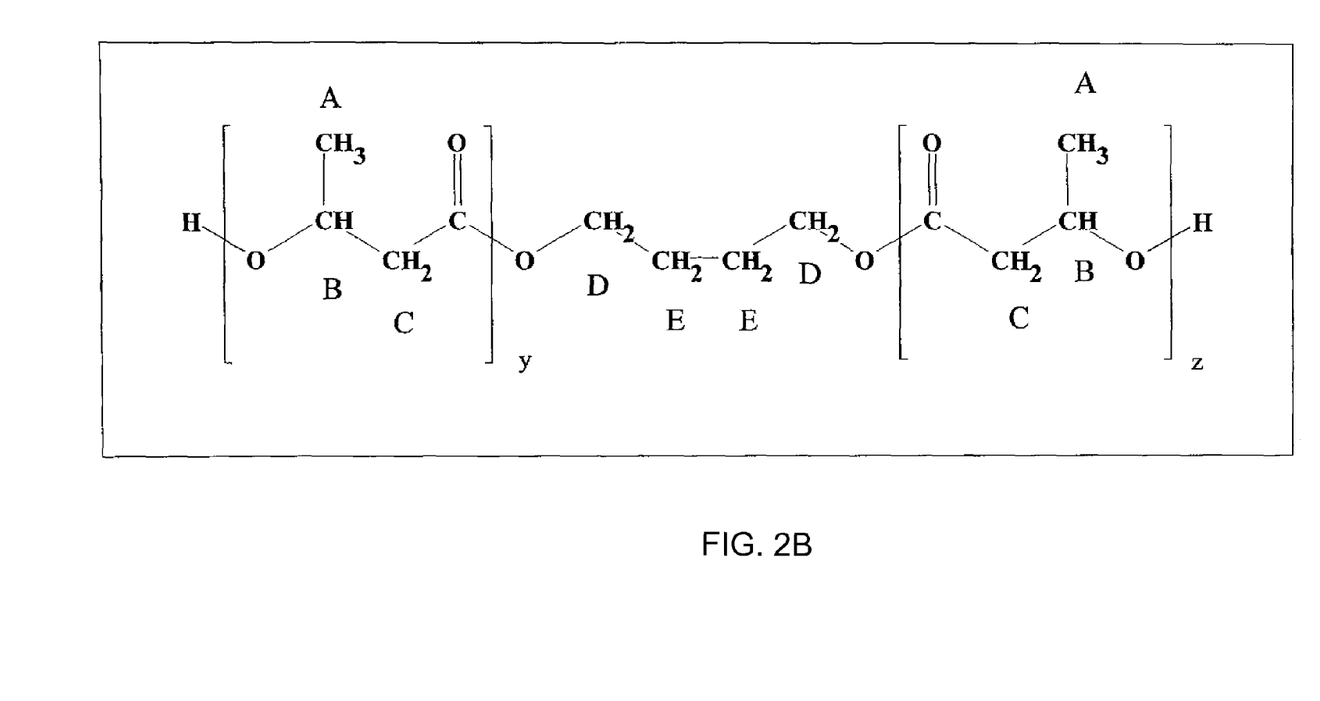
FIG. 2B shows the formula of the PHB diol.

Characterisation and properties of the macro-diol I components:

Chemical Characterisation:

The essential method for the characterisation of the macro-diol I components was still $^1H$-NMR spectroscopy. FIG. 2A shows the NMR spectrum of a batch of butanediol-bis-PHB. From the NMR spectrum, both the structure assignment and, from the integration, the calculation of the molecular weight are possible.

1.3 Specification for Small Quantity Synthesis of Macro-Diols II (Soft Segment Macro-Diols)

In all the previously described batches, the process started with a commercial macro-diol component II, firstly poly-ϵ-caprolacton, thereafter generally mostly polybutylene glycol adipate diol, occasionally polydiethylene glycol adipate diol. The synthesis of the macro-diol component II was effected according to the general specification:

The dicarboxylic acid dimethylester and the diol to be used are mixed in the ratio 18:19. The components are melted in the presence of catalytic quantities of the transesterification catalyst (e.g. dibutyltin oxide). The released methanol is distilled off under normal pressure. The oil bath temperature is then reduced from 140° to 70°, a water jet vacuum is applied for a further 5 hours in order to remove residual methanol. The resulting product is produced as a melt. It is introduced in liquid form either as a melt or as a dioxane solution into the reaction to form polyester urethane. The same specification can be applied also for the synthesis of macro-diols II using hydroxycarboxylic acids or derivatives thereof instead of dicarboxylic acid dimethylester+diol.

2. Synthesis Specifications for the Production of Polyester Urethanes

2.1. Preparation of the Polyester Urethanes (Variant 1)

After partial azeotropic distillation of the 1,2-dichloroethane, the polyester urethanes were synthesised by polyaddition of poly(-(R)-3-hydroxybutyrate)-diol and poly(butylene adipate)-diol with 1,6-hexamethylene diisocyanate (according to G. R. Saad). Dibutyltindilaurate was used as catalyst. The polymers were precipitated, washed and dried. The analysis was effected in turn by means of GPC and $^1H$-NMR spectroscopy. The compositions of the products were hereby investigated, as a function of the mixture ratio of the educts, the distillation quantity of azeotrope, the catalyst quantity, the reaction time, the quantity of 1,6-hexamethylene diisocyanate and the solvent concentration.

Figure 3A:
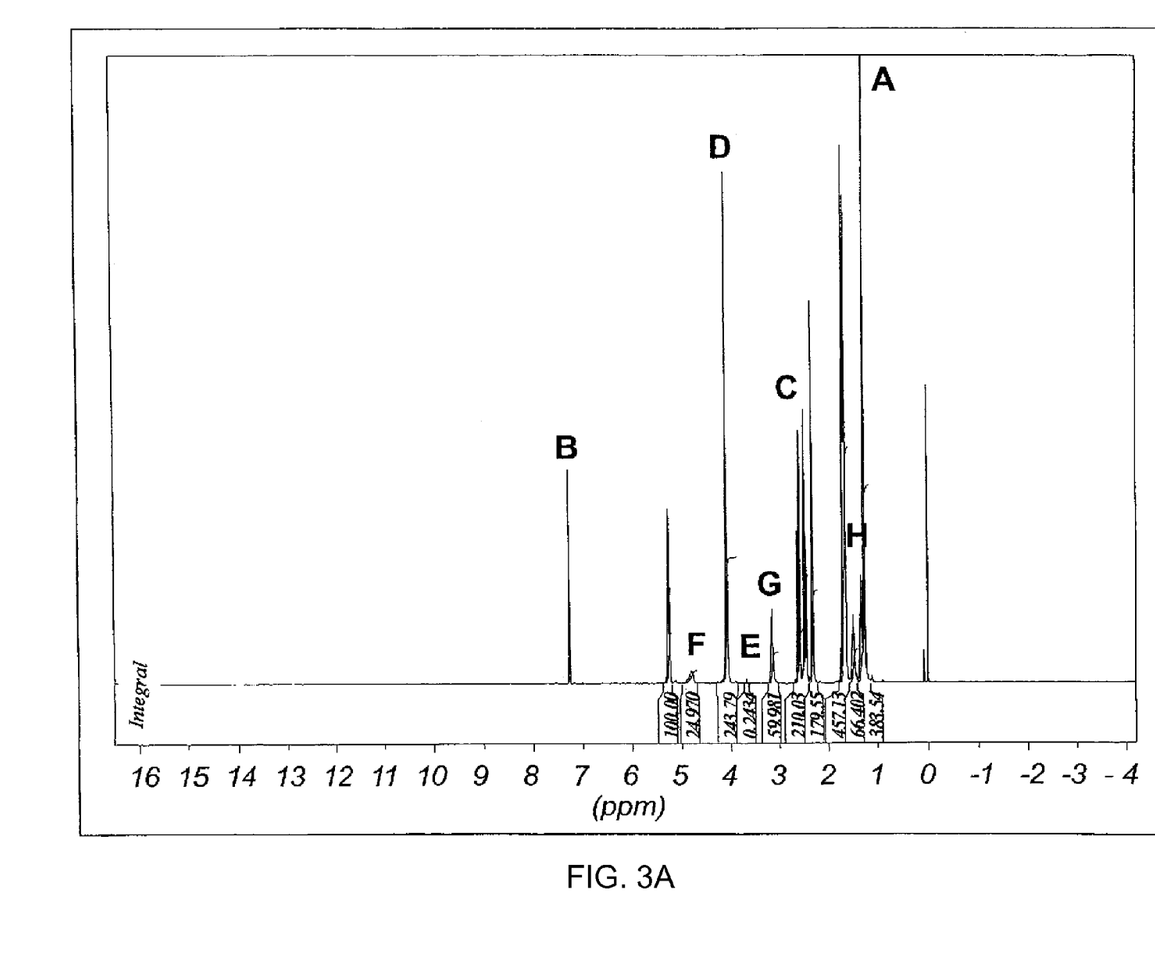
FIG. 3A shows the $^1$H nuclear resonance spectrum of polyester urethane 50:50 (400 MHz)
Figure 3B:
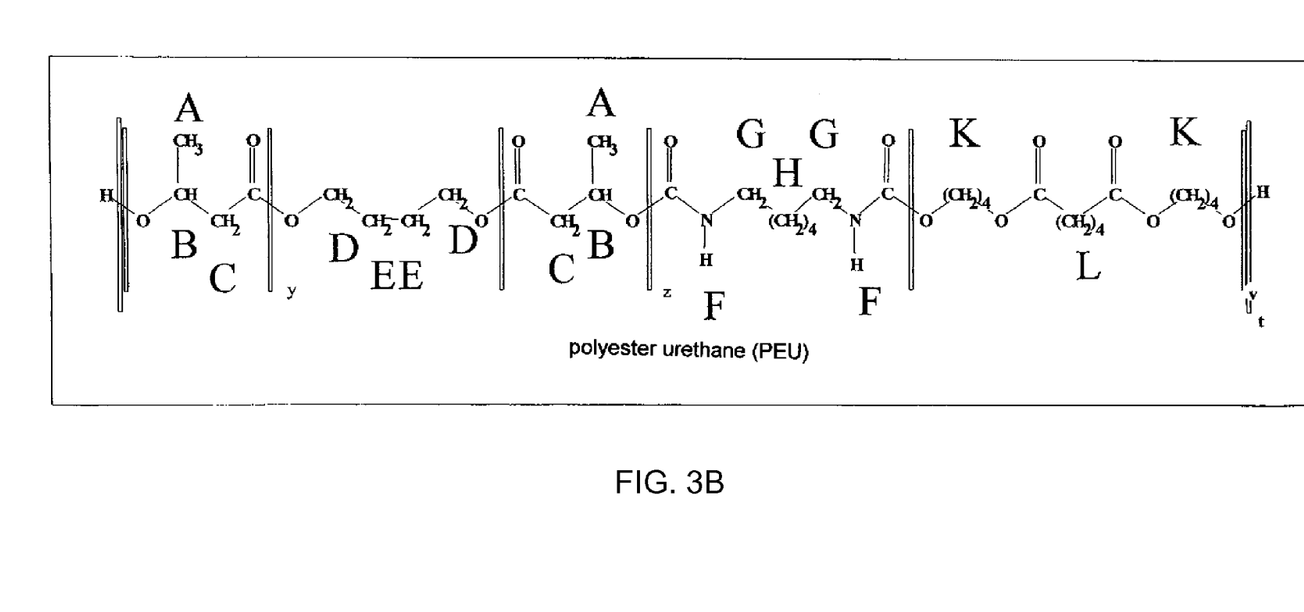
FIG. 3B shows the formula of the polyester urethane.

FIG. 3A shows by way of example the $^1H$-NMR spectrum of polyester urethane 50:50 (400 MHz).

It was shown in further tests that further improvements can be achieved relative to the specification of G. R. Saad.

On the one hand 1,2-dichloroethane can be replaced without disadvantage by 1,4-dioxane. On the other hand, the organotin catalyst was substituted by various metal acetylacetonates. In particular, the zirconium-(IV)-acetylacetonate catalyst was conspicuous in a positive manner due to high activity (reduction in reaction time) and high selectivity (low allophanate formation).

When using the metal acetylacetonates as catalyst, it should be emphasised that, in contrast to organotin catalysts with their partially carcinogenic potential, of concern hereby are biocompatible catalysts. In this way, a reaction system was surprisingly able to be provided which is based solely on biocompatible components, i.e. educts, solvents and catalysts.

For the conversion of PHB diol and PBA diol (in the weight ratio 1:1) with equimolar quantities of 1,6-hexamethylene diisocyanate (PEU 50:50) at 75° C., the following results were achieved (Table 1).

TABLE 1

| Catalyst | Molecular weight |
|---|---|
| Manganese (II) acetylacetonate | 6,300 g/mol |
| Aluminium (III) acetylacetonate | 16,000 g/mol |
| Zirconium (IV) acetylacetonate | 43,000 g/mol |

The two components PHA and PEU are typically mixed together in the ratio 80/20 to 90/10. The proportion of PEU can therefore move in general in the range of 1% to 50%. The composition of the PEU component is typically such that PHB diol:PBA diol–(=polybutylene glycol adipate diol)– segments are contained in the ratio of approx. 40:60 to 80:20, preferably in the ratio 60:40. The mixture is preferably produced such that the components are mixed together in the extruder in the melt. Alternatively, the components can be mixed in solution, e.g. 1,4-dioxane, 1,3-dioxolane or chloroform being possible as solvent.

2.2 Preparation of the Polyester Urethanes (Variant 2)

A mixture of macro-diol I and macro-diol II in the specified input ratio are dissolved in dioxane and precipitant (25% dioxane+75% cyclohexane) in the ratio 4:1. The total solvent quantity is reduced by distilling-off to ⅗ of the volume (optimally for batch 60% PHB diol and 40% PBA diol; in the batch 40% PHB diol and 60%, the process starts from dioxane:precipitant=6:1 and is distilled off to ⅚ of the volume). At the same time, residual water is thereby discharged. The temperature is then reduced from 101° to 92°. Zirconium acetylacetonate is added. Subsequently an equimolar quantity of hexamethylene diisocyanate is added in drops during 2.5 hours; the reaction then runs in total for 4 hours. Then precipitant (25% dioxane+75% cyclohexane) is put in place. The hot reaction solution is introduced slowly with agitation. The polyester urethane is precipitated and distilled off after cooling to room temperature. The material dries in air after the filtration. A yield of >98% is typically achieved.

3. Blends of Biopolyester Urethane and PHB or PHB-co-HV

PEU Components:
PEU from diethyleneglycol-bis-PHB (60 or 65% by weight) and PBA diol (40% or 35% by weight)
PHB-co-HV:
PHB-co-HV with 15% HV proportion (determined from evaluation of the NMR spectrum, PHB industrial S. A.)
Fibre Materials:
steam pressure-disintegrated flax fibres (flax DDA), wood fibres in the form of wood dust, wood pulp, wood chips.

3.1. Mechanical Properties of the Blends of PEU and PHB-co-HV

The following blends were produced (details respectively in % by weight):
90% PHB-co-HV+10% PEU from diethyleneglycol-bis-PHB+PBA 60:40
80% PHB-co-HV+20% PEU from diethyleneglycol-bis-PHB+PBA 60:40
70% PHB-co-HV+30% PEU from diethyleneglycol-bis-PHB+PBA 60:40
The determined mechanical properties are compiled in Table 2.

The tensile modulus of elasticity of these samples at approx. 420-500 N/mm² is significantly higher than that of previously observed, non-fibre-reinforced PEU samples (cf. samples nos. 1-6 in Table 2). The same applies for the bending modulus of elasticity.

3.2. Example: Reinforcement with Natural Fibres

Fibre Materials:
The choice of fibre materials was essentially effected on the basis that they were easy to obtain, at a low price and in any quantity and with a suitable specification. There were used as standard:
steam pressure-disintegrated flax fibres (Flax DDA)
wood fibres in the form of wood pulp, wood chips, partly as pretreated wood fibres.
Incorporation of the Fibres into the Blends:
The incorporation of the fibre components was effected
in a kneader, or
in a rolling mill
Table 3 compiles the empirical results which were collected during processing in the kneader. Incorporation of the fibres was effected under very different temperature conditions below or above the melting point and over a fairly short (approx. 50 min) or longer (approx. 1.5 h) time interval. In general, wood chips could be incorporated better than flax fibres. The polymer-wood material is coloured brown, decomposition beginning at a higher temperature not being able to be excluded. The fibre incorporation leads to a grey material which is grey-brown with longer treatment at a higher temperature.

3.3. Mechanical Properties of the Blends with Fibre Filling

A dramatic property jump into a new order of magnitude is produced if approx. 30% flax or wood fibres are mixed into a blend material comprising 80% PHB-co-HV+20% PEU from diethyleneglycol-bis-PHB:PBA=60:40. Table 2, for these samples, indicates tensile and bending moduli of elasticity in the range of 4,500 to 5,000 N/mm². For comparison, the specific mechanical properties of mineral oil-based composite materials with natural fibres are reproduced in Table 3, such as e.g. the tensile and bending strength of polypropylene filled with flax and cotton.

Figure 4:
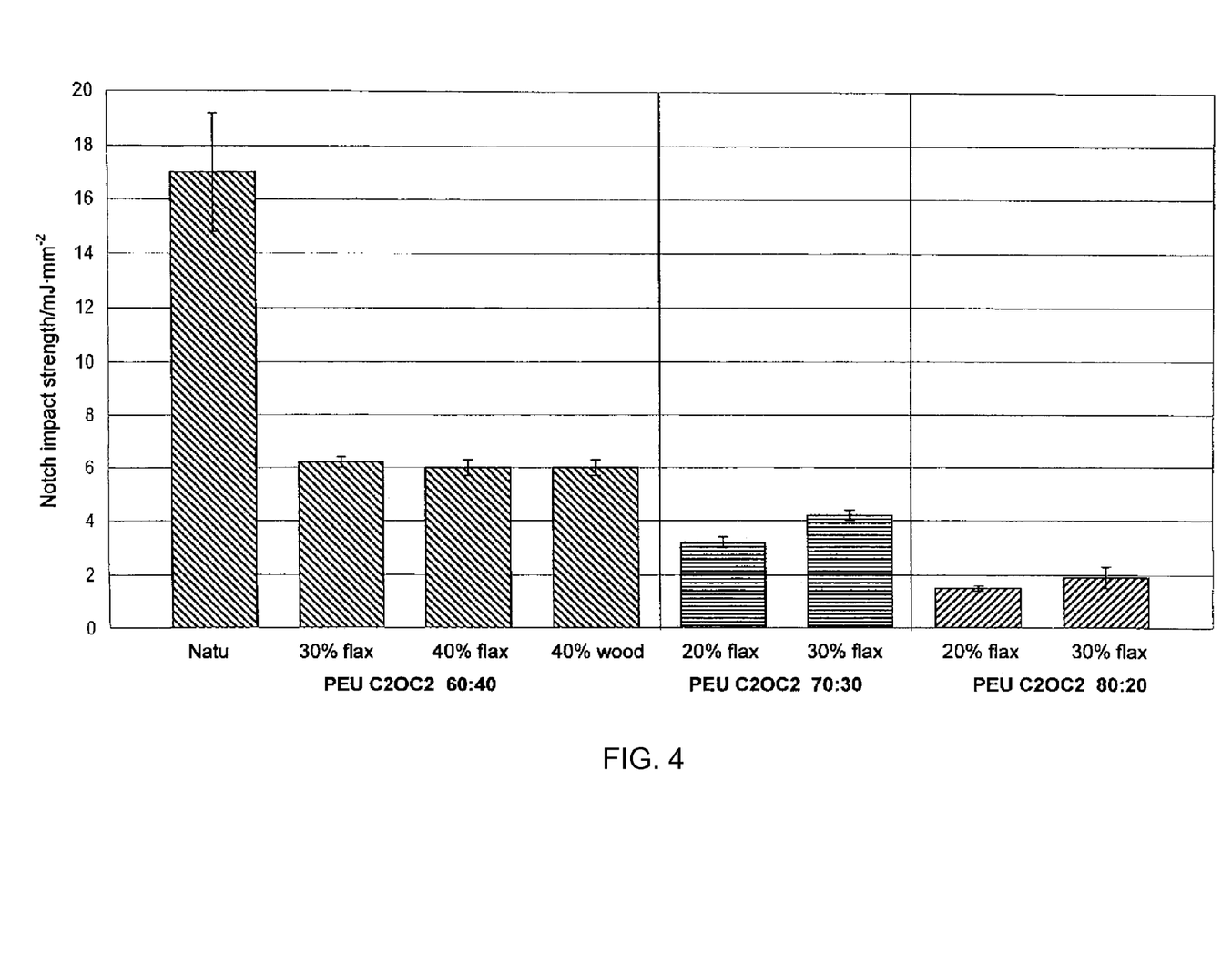
FIG. 4 shows a comparison of the notch impact strength of biopolyester urethane composites with flax or wood dust filling.

As can be seen from the comparison, the values of the mechanical properties which are present for fibre composite materials based on polypropylene are achieved if not actually exceeded with these new materials produced on a bio-basis, at least as far as tensile and bending moduli of elasticity are concerned. The notch impact strength remains of the order of magnitude shown in FIG. 4. Only the elasticity, represented by the tensile and bending elongation is slightly reduced.

4. Discussion: PEU-PHB-co-HV Blends and Composites

With the blends according to the invention comprising PEU and PHB-co-HV, the door is opened to a new, better in every respect, and advantageous material line, as is evident from the following discussion describing the essential advantages of the new materials.
Discussion Material Properties:
As is evident from the preceding description, composites based on PHB have been produced for the first time after reinforcing with flax or wood dust, the fibre-filled material polymers based on mineral oil, such as polyethylene or polypropylene, are equal with respect to their properties.

Discussion Environmental Aspects:

Apart from the furthermore chemical-based components polybutylene glycol adipate and hexamethylene diisocyanate, all other components of the composites are constructed from biomaterials. The production is effected in environmentally compatible processes. Although the tests for the biological decomposition are still to be done, it can be assumed that this is effected likewise easily in a dump just as biodecomposition which is tested or known for the components.

Discussion Economic Aspects:

In comparison with previously considered biopolyester urethanes and composites produced therefrom, a new economic approach results: the more expensive component PEU in the new described blends according to the invention only makes up 10 to 30%, i.e. almost takes over the role of an additive. In most cases considered, 80% blend proportion was allocated to the biogenic "basic material" PHB-co-HV. Since the newer fermentation methods from whey or glycerine move increasingly in the direction of production of PHB-co-HV, the combination of both development lines can allow anticipation in future of a significantly more economical production of blends and composites based on PEU+PHB-co-HV.

The fact that economical filling materials, such as flax or wood dust, exert such an enormous reinforcing effect permits in addition the expectation that a new material line can be produced on the basis of such components, which material line delivers competitive products for various applications from the point of view of properties and production costs.

TABLE 2

Mechanical properties of blends comprising PEU + PHB-co-HV and also composites consisting of PEU + PHB-co-HV + flax or wood fibre

| Sample title | Filler Type | Filler proportion (%) | Tensile modulus (N/mm$^2$) | St. dev. (+−) | Tensile stress (N/mm$^2$) | St. dev. (+−) | Tensile elongation (%) | Melt temperature DSC Onset (°C.) | Melt temperature DSC Peak (°C.) |
|---|---|---|---|---|---|---|---|---|---|
| 10% C2OC2 60:40 90% BC 2000-0 | | | 503 | 27.1 | 32.8 | 0.7 | 11.7 | | |
| 10% C2OC2 60:40 90% BC 2000-0 Tensile rate 3 mm/min | | | 474 | 32.2 | 30 | 0.5 | 11.1 | | |
| 20% C2OC2 60:40 80% BC 2000-0 | | | 467 | 25 | 30.6 | 1.4 | 13.2 | | |
| 20% C2OC2 60:40 80% BC 2000-0 Tensile rate 3 mm/min | | | 463 | 7.7 | 28.4 | 0.7 | 12.1 | | |
| 20% C2OC2 60:40 70% BC 2000-1 | | | 423 | 12.3 | 26.2 | 0.6 | 12.2 | | |
| 30% C2OC2 60:40 70% BC 2000-0 Tensile rate 3 mm/min | | | 409 | 10.6 | 23.6 | 0.9 | 10.7 | | |
| 20% C2OC2 60:40 80% BC 2000-0 | Fl | 20 | 547 | 36.6 | 33.8 | 0.4 | 12.7 | | |
| 20% C2OC2 60:40 80% BC 2000-0 Tensile rate 3 mm/min | Fl | 20 | 518 | 46.8 | 31.5 | 0.8 | 12.4 | | |
| 01-01(BC2000[56%], PEU60:40 [14%]) | Fl | 30 | 4426 | 139 | 29.1 | 0.5 | 1.3 | | |
| 01-02(BC2000[56%], PEU60:40 [14%]) | Ho | 30 | 4734 | 223 | 23.7 | 0.7 | 0.7 | | |
| 01-03(BC2000[56%], PEU65:35 [14%]) | Fl | 30 | 4523 | 96 | 25.1 | 0.4 | 1.2 | | |
| 01-04(BC2000[56%], PEU65:35 [14%]) | Ho | 30 | 2364 | 23 | 11.9 | 0.1 | 0.7 | | |
| C2OC2 65:35 | Ho | 30 | 2494 | 64 | 13.2 | 0.3 | 0.8 | 130.15 | 147.98 |
| C2OC2 65:35 | Fl | 30 | | | | | | | |
| C2OC2 65:35 | HoF | 20 | | | | | | | |

| Sample title | St. dev. (+−) | Bending modulus (N/mm$^2$) | St. dev. (+−) | Bending stress (N/mm$^2$) | St. dev. (+−) | Bending elongation (%) | St. dev. (+−) | Notch impact strength (mJ/mm$^2$) | St. dev. (+−) |
|---|---|---|---|---|---|---|---|---|---|
| 10% C2OC2 60:40 90% BC 2000-0 | 0.5 | 1195 | 31.4 | 30.5 | 1.3 | 4.7 | 0.1 | 1.5 | 0.1 |
| 10% C2OC2 60:40 90% BC 2000-0 Tensile rate 3 mm/min | 0.1 | 1195 | 31.4 | 30.5 | 1.3 | 4.7 | 0.1 | 1.5 | 0.1 |
| 20% C2OC2 60:40 80% BC 2000-0 | 0.4 | 1060 | 29.1 | 28.8 | 0.7 | 5.3 | 0.2 | 1.4 | 0.2 |
| 20% C2OC2 60:40 80% BC 2000-0 Tensile rate 3 mm/min | 0.8 | 1060 | 29.1 | 28.8 | 0.7 | 5.3 | 0.2 | 1.4 | 0.2 |
| 20% C2OC2 60:40 70% BC 2000-1 | 0.5 | 913 | 21.2 | 23.2 | 0.4 | 4.5 | 0.3 | 1.9 | 0.4 |
| 30% C2OC2 60:40 70% BC 2000-0 Tensile rate 3 mm/min | 0.8 | 913 | 21.2 | 23.2 | 0.4 | 4.5 | 0.3 | 1.9 | 0.4 |
| 20% C2OC2 60:40 80% BC 2000-0 | 0.5 | 1597 | 28.1 | 32.3 | 0.4 | 4.2 | 0.1 | 4.4 | 0.3 |
| 20% C2OC2 60:40 80% BC 2000-0 Tensile rate 3 mm/min | 0.6 | 1597 | 28.1 | 32.3 | 0.4 | 4.2 | 0.1 | 4.4 | 0.3 |
| 01-01(BC2000[56%], PEU60:40 [14%]) | 0.1 | 4815 | 135 | 53.2 | 0.9 | 1.8 | 0.1 | 4.1 | 0.4 |
| 01-02(BC2000[56%], PEU60:40 [14%]) | 0.1 | 5095 | 191 | 48.2 | 1.3 | 1.3 | 0.1 | 3.8 | 0.4 |
| 01-03(BC2000[56%], PEU65:35 [14%]) | 0.1 | 5291 | 66 | 52.7 | 1.5 | 1.6 | 0.1 | 3.7 | 0.3 |
| 01-04(BC2000[56%], PEU65:35 [14%]) | 0 | 2437 | 82 | 21.9 | 0.6 | 1.2 | 0 | 4.1 | 0.4 |
| C2OC2 65:35 | 0.1 | 4188 | 92 | 32.6 | 0.5 | 1.1 | 0.1 | 4.4 | 0.2 |
| C2OC2 65:35 | | | | | | | | | |
| C2OC2 65:35 | | | | | | | | | |

TABLE 3

Comparison: Tensile and bending strength of polypropylene, filled with flax and cotton

| Press plates | Tensile strength [N/mm$^2$] | Tensile elongation [%] | Tensile modulus of elasticity [N/mm$^2$] | Bending strength [N/mm$^2$] | Bending modulus of elasticity [N/mm$^2$] | Impact strength [mJ/mm$^2$] |
|---|---|---|---|---|---|---|
| Flax mech. (40%) with PP | 40 | 5.1 | 2000 | 80 | 4700 | 36 |
| Flax DDA (40%) with PP | 75 | 5.4 | 3600 | 145 | 7000 | 45 |
| PA fibre/flax (50:50) | 72.4 | 2.3 | 4040 | 143 | 5670 | 21 |
| Roast flax (25%) injection moulding PP | 340 | | 4500 | 61 | 3400 | |
| Flax DDA (25%) injection moulding PP | 35 | | 4000 | 61 | 3200 | |
| Cotton (25%) injection moulding PP | 40 | | 4000 | 65 | 3400 | |

The invention claimed is:

1. A composite system, comprising
  a) at least one biodegradable block copolyester urethane, the block copolyester urethane being formed from
    (i) a hard segment comprising a polyhydroxyalkanoate diol; and
    (ii) a polyester diol soft segment and/or polyester ether diol soft segment formed from a diol and/or triol and a dicarboxylic acid or hydroxycarboxylic acid and derivatives thereof as co-component;
  wherein the hard segment and the soft segment are linked with a bifunctional isocyanate,
  b) at least one poly-(R)-3-hydroxyalkanoate,
  c) a filler comprising flax fibers and/or derivatives thereof, and
  d) optionally one or more further additives,
  wherein the weight proportion of the at least one poly-(R)-3-hydroxyalkanoate is of 95 to 99.9% by weight; and
  wherein the weight proportion of the hard segment to the soft segment is from 60:40 to 65:35.

2. The composite system according to claim 1, wherein the at least one biodegradable block copolyester urethane and the at least one poly-(R)-3-hydroxyalkanoate are present as a blend, polymer mixture and/or as polymer alloy.

3. The composite system according to claim 1, wherein the weight proportion of the block copolyester urethane is of 0.1 to 5% by weight.

4. The composite system according to claim 1, wherein the elasticity, toughness or tensile elongation of the composite system is adjustable by changing the weight proportion of the at least one biodegradable block copolyester urethane and the filler.

5. The composite system according to claim 1, wherein the polyhydroxyalkanoate diol is a poly-2-hydroxyalkanoate diol, a poly-3-hydroxyalkanoate diol and/or a poly-4-hydroxyalkanoate diol, and/or the polyhydroxy alkanoate diol contains aliphatic, araliphatic or aromatic side chains.

6. The composite system according to claim 1, wherein the diol is aliphatic, cycloaliphatic, araliphatic and/or aromatic.

7. The composite system according to claim 1, wherein the diol is a low molecular diol with 2 to 10 C atoms and/or is an oligoether diol and/or a polyether diol.

8. The composite system according to claim 7, wherein the diol is 1,4-butane diol and/or diethylene glycol.

9. The composite system according to claim 1, wherein the dicarboxylic acid producing the soft segment is aliphatic, cycloaliphatic, araliphatic, aromatic, or a combination thereof.

10. The composite system according to claim 9, wherein the soft segment is selected from the group consisting of polybutylene glycol adipate diol (PBA diol), poly-ε-caprolacton, polydiethylene glycol adipate diol and/or mixtures hereof.

11. The composite system according to claim 1, wherein the bifunctional isocyanate is aliphatic, cycloaliphatic, araliphatic, aromatic, or a combination thereof.

12. The composite system according to claim 11, wherein the bifunctional isocyanate is selected from the group consisting of tetramethylene diisocyanate, hexamethylene diisocyanate, isophorone diisocyanate, and combinations thereof.

13. The composite system according to claim 1, wherein the optional one or more further additives are selected from the group consisting of biocompatible adhesives, colour pigments, mould-release agents, carbon black, and combinations thereof.

14. The composite system according to claim 1, wherein the optional one or more further additives are selected from the group consisting of polyethylene glycol, polyvinyl alcohol, and combinations thereof.

15. The composite system according to claim 1, wherein the composite system comprises between 1% by weight, relative to the total composite system, of the filler.

16. The composite system according to claim 1, wherein the composite system is constructed in layers consisting of a filler layer which is coated with the at least one biodegradable block copolyester urethane and the at least one poly-(R)-3-hydroxyalkanoate.

17. The composite system according to claim 1, wherein at least one further polymer is blended and/or alloyed with the composite system.

18. The composite system according to claim 1, wherein the tensile strength stress of the composite system is from 28.4 N/mm$^2$ to 32.8 N/mm$^2$.

19. A moulded article, moulded part, or extrudate produced from a composite system according to claim 1.

20. A method of producing foils, films, laminates, moulded articles, containers, reinforced adhesive layers, packaging materials, moulded parts, extrudates, coating materials or medicine dispensers comprising utilizing the composite system according to claim 1.

21. The method according to claim 20 wherein the coating materials coat paper or starch.

22. The method according to claim 20 wherein the packaging material package foodstuffs.

23. The method according to claim 20 wherein the containers are bags.

24. The method according to claim 20 wherein the moulded articles are medical implants or galenics.

25. The method according to claim 20, wherein the films are wrappings.

\* \* \* \* \*